United States Patent [19]

Yamamoto et al.

[11] Patent Number: 5,696,568

[45] Date of Patent: Dec. 9, 1997

[54] LIQUID CRYSTAL DISPLAY DEVICE

[75] Inventors: Yasuhiro Yamamoto, Tenri; Shigeaki Mizushima, Ikoma, both of Japan

[73] Assignee: Sharp Kabushiki Kaisha, Osaka, Japan

[21] Appl. No.: 705,050

[22] Filed: Aug. 29, 1996

[30] Foreign Application Priority Data

Aug. 31, 1995 [JP] Japan ................... 7-224151

[51] Int. Cl.$^6$ .......................... G02F 1/1337
[52] U.S. Cl. .......................... 349/136; 349/110
[58] Field of Search .................. 349/110, 41, 111, 349/123, 124, 125, 126, 127, 128, 129, 132, 134, 136; 428/1

[56] References Cited

U.S. PATENT DOCUMENTS

| | | | |
|---|---|---|---|
| 5,345,234 | 9/1994 | Koseki et al. ............. | 349/111 |
| 5,398,127 | 3/1995 | Kubota et al. ............. | 349/126 |
| 5,488,499 | 1/1996 | Tanaka et al. ............. | 349/177 |
| 5,579,141 | 11/1996 | Suzuki et al. ............. | 349/124 |
| 5,585,951 | 12/1996 | Noda et al. . | |

FOREIGN PATENT DOCUMENTS

| | | |
|---|---|---|
| 2-166422 | 6/1990 | Japan . |
| 4-212161 | 8/1992 | Japan . |
| 5-323368 | 12/1993 | Japan . |

*Primary Examiner*—William L. Sikes
*Assistant Examiner*—Tai V. Duong
*Attorney, Agent, or Firm*—Birch, Stewart, Kolasch & Birch, LLP

[57] ABSTRACT

A liquid crystal display device including: a liquid crystal layer; a liquid crystal alignment film in contact with the liquid crystal layer; a first substrate and a second substrate which are disposed so as to face each other with the liquid crystal layer sandwiched therebetween; a plurality of pixel electrodes arranged in a matrix on a surface, facing the liquid crystal layer, of the first substrate; and a counter electrode formed on a surface, facing the liquid crystal layer, of the second substrate. In the liquid crystal display device, a black matrix covering at least portions between the pixel electrodes is formed over the surface of the first substrate, facing the liquid crystal layer; the black matrix is formed in a taper shape having a taper angle θ smaller than 90 degrees; and the liquid crystal alignment film provides a pretilt angle larger than one-half of the taper angle θ.

4 Claims, 6 Drawing Sheets

LIQUID CRYSTAL DISPLAY DEVICE

BACKGROUND OF THE INVENTION

1. Field of the Invention

The present invention relates to a liquid crystal display device including active elements such as thin-film transistors (hereinafter, simply referred to as "TFTs").

2. Description of the Related Art

As a conventional liquid crystal display device including active elements, an active matrix type liquid crystal display device is well known. An active matrix liquid crystal display device includes: a pair of substrates disposed so as to face each other; a liquid crystal layer sandwiched between the pair of substrates; a plurality of pixel electrodes arranged in a matrix on one of the pair of substrates; and a plurality of active elements such as TFTs, each of which is connected to the corresponding one of the pixel electrodes.

In this active matrix type liquid crystal display device, a light blocking film called a "black matrix" (hereinafter, simply referred to as a "BM") covering the entire portion other than the pixels is generally provided for increasing a contrast ratio and suppressing the variation in the characteristics of the active elements owing to the incidence of the light.

Conventionally, this BM has been formed not on the substrate including an active element array thereon, but on the counter substrate opposed to the former substrate via the liquid crystal layer. In such a case, for increasing a numerical aperture (to be determined depending upon the relationship between the aperture of the BM and the pixel electrodes), it is necessary to locate the BM and the pixel electrodes with high precision. It has recently become more and more necessary to utilize light more efficiently by increasing the numerical aperture for reducing the power consumption. In addition, it is also necessary to minimize the error to be generated during positioning of the two substrates in the case of forming the BM on the counter substrate. Thus, a BM-on-array type liquid crystal display device including a BM formed on the substrate, on which an active element array is formed, has been proposed (see, for example, Japanese Laid-Open Patent Publication No. 2-166422).

FIG. 4 is a cross-sectional view illustrating an exemplary BM-on-array type liquid crystal display device. This liquid crystal display device includes a pair of glass substrates 2 and 3 facing each other via a liquid crystal layer 1. On the glass substrate 2, a color filter layer 4; a transparent counter electrode 5; and a liquid crystal alignment film 6 for controlling the orientation directions of the liquid crystal molecules are formed in this order. On the glass substrate 3, pixel electrodes 7; source lines 8 for supplying electric charges to the pixel electrodes 7; TFTs 9 functioning as switching elements; and gate lines 10 for supplying a control signal to the TFTs 9 are formed.

A TFT 9 includes: a gate electrode 10 or a part of the gate line 10 formed on the glass substrate 3; a gate insulating film 11 formed so as to cover the gate electrode 10; a semiconductor layer 12 formed on the gate insulating film 11 so as to be opposed to the gate line 10; and a source electrode 8 (or a part of the source line 8) and a drain electrode 13 which are formed on the semiconductor layer 12 so as to be separated from each other.

In order to suppress the variation in the device characteristics by preventing the light from being incident onto the TFTs 9 and to prevent uncontrollable light leaking through this portion from affecting the display contrast ratio, a BM 15 is formed so as to cover the TFT 9, the source line 8 and the gate line 10 via an insulating film 14. As the BM 15, a film made of a metallic material having light blocking properties is used.

FIG. 5 illustrates another type of liquid crystal display device having a different configuration from that of the liquid crystal display device illustrated in FIG. 4. In this liquid crystal display device, the BM 15 is made of an insulating resin.

The liquid crystal display device illustrated in FIG. 4 has the following problems. Since the BM 15 is made of a metallic material, if some failure is caused in the insulating film (e.g., in the contact hole), electrical leakage is generated, so that the characteristics of the device become defective. In addition, since a parasitic capacitance is generated between the BM 15 and each line, it is necessary to design the circuits very carefully.

On the other hand, since the BM 15 is made of an insulating resin in the liquid crystal display device illustrated in FIG. 5, no electrical leakage and no parasitic capacitance are caused. However, the BM made of a resin has poorer light blocking properties than those of the BM made of a metal, the thickness of the resin film is required to be large. If the thickness of the BM is increased in order to improve the light blocking properties, then the height of the film becomes non-uniform and a step-like portion is formed as shown in FIGS. 6A and 6B. As a result, the pretilt directions of the liquid crystal molecules are reversed and a disclination is generated, so that the quality of the resulting image is adversely deteriorated.

FIGS. 6A and 6B are cross-sectional views taken along the plane parallel to the orientation directions of the liquid crystal molecules for schematically illustrating the disclination generated among the liquid crystal molecules. In this liquid crystal display device, a pair of substrates 2 and 3 are disposed so as to face each other via a liquid crystal layer 1, and a liquid crystal alignment film 6 for controlling the orientation directions of the liquid crystal molecules is formed on the surface of each of the substrates 2 and 3 which is in contact with the liquid crystal layer 1. Since the orientation directions of the liquid crystal molecules are generally twisted by 90°, the cross-sections of the substrates 2 and 3 in FIGS. 6A and 6B actually cross each other at a right angle.

The liquid crystal alignment film 6 aligns the orientation directions of the liquid crystal molecules in a certain direction. As illustrated in FIG. 6A, the liquid crystal molecules can be aligned so as to maintain a constant pretilt angle and a constant pretilt direction in the region having no step-like portion, but the pretilt directions of the liquid crystal molecules are reversed with respect to the substrate 2 in the region having a step-like portion. When a voltage is applied to this liquid crystal display device, the liquid crystal molecules rise to a pretilt direction as illustrated in FIG. 6B. As a result, a discontinuity is generated in the orientation of the liquid crystal molecules in the vicinity of the step-like portion, and a disclination is generated. This disclination causes scattering of the light and it is difficult to control the generation of the disclination and the degree of the light scattering. Therefore, when a moving picture is displayed on such a liquid crystal display device, a residual image is disadvantageously caused.

Moreover, if the thickness of the BM is large, then it is difficult to control the thickness of the film to be uniform. Since the orientation directions of the liquid crystal molecules are largely affected by the shape of the BM as described above, such a film having a non-uniform thickness is more likely to cause an uneven display. In order to prevent such an uneven display, a method different from that of the present invention is disclosed in Japanese Laid-Open Patent Publication No. 5-323368, in which the thickness of the film is controlled by applying a colored layer by means of sputtering.

SUMMARY OF THE INVENTION

The liquid crystal display device of the invention includes: a liquid crystal layer; a liquid crystal alignment film in contact with the liquid crystal layer; a first substrate and a second substrate which are disposed so as to face each other with the liquid crystal layer sandwiched therebetween; a plurality of pixel electrodes arranged in a matrix on a surface, facing the liquid crystal layer, of the first substrate; and a counter electrode formed on a surface, facing the liquid crystal layer, of the second substrate. In the liquid crystal display device, a black matrix covering at least portions between the pixel electrodes is formed over the surface, facing the liquid crystal layer, of the first substrate; the black matrix is formed in a taper shape having a taper angle θ smaller than 90 degrees; and the liquid crystal alignment film provides a pretilt angle larger than one-half of the taper angle θ.

In one embodiment, the black matrix is formed of a film having a controlled thickness.

In another embodiment, the first substrate includes a plurality of active elements, each of which is connected to a corresponding one of the plurality of pixel electrodes.

In still another embodiment, the black matrix is formed of an insulating resin.

Hereinafter, the functions or the effects to be attained by the present invention will be described.

According to the present invention, the sum of the pretilt angles of the two liquid crystal alignment films provided for both the substrates becomes larger than the taper angle of the BM. Thus, even though the tilt angles of the liquid crystal molecules are sometimes reversed in a non-display region having a step-like portion, the average tilt direction of the liquid crystal molecules in the non-display region is the same as that in the display region having no step-like portion, in view of the pretilt angles of the two substrates. Thus, since the liquid crystal molecules in the non-display region rise to the same direction as the rising direction of the liquid crystal molecules in the display region when a voltage is applied to the liquid crystal layer, no discontinuity is caused among the orientation directions of the liquid crystal molecules.

In addition, if a BM is formed of a film having a controlled thickness, the thickness of the BM thus obtained becomes uniform.

Thus, the invention described herein makes possible the advantage of providing a liquid crystal display device which can display a high-definition image by preventing the pretilt angles of the liquid crystal molecules from being reversed owing to .the step-like portion of a BM and by controlling the thickness of the BM so that it is uniform.

This and other advantages of the present invention will become apparent to those skilled in the art upon reading and understanding the following detailed description with reference to the accompanying figures.

DESCRIPTION OF THE PREFERRED EMBODIMENTS

Hereinafter, the embodiments of the present invention will be described with reference to the accompanying drawings.

Figure 1:
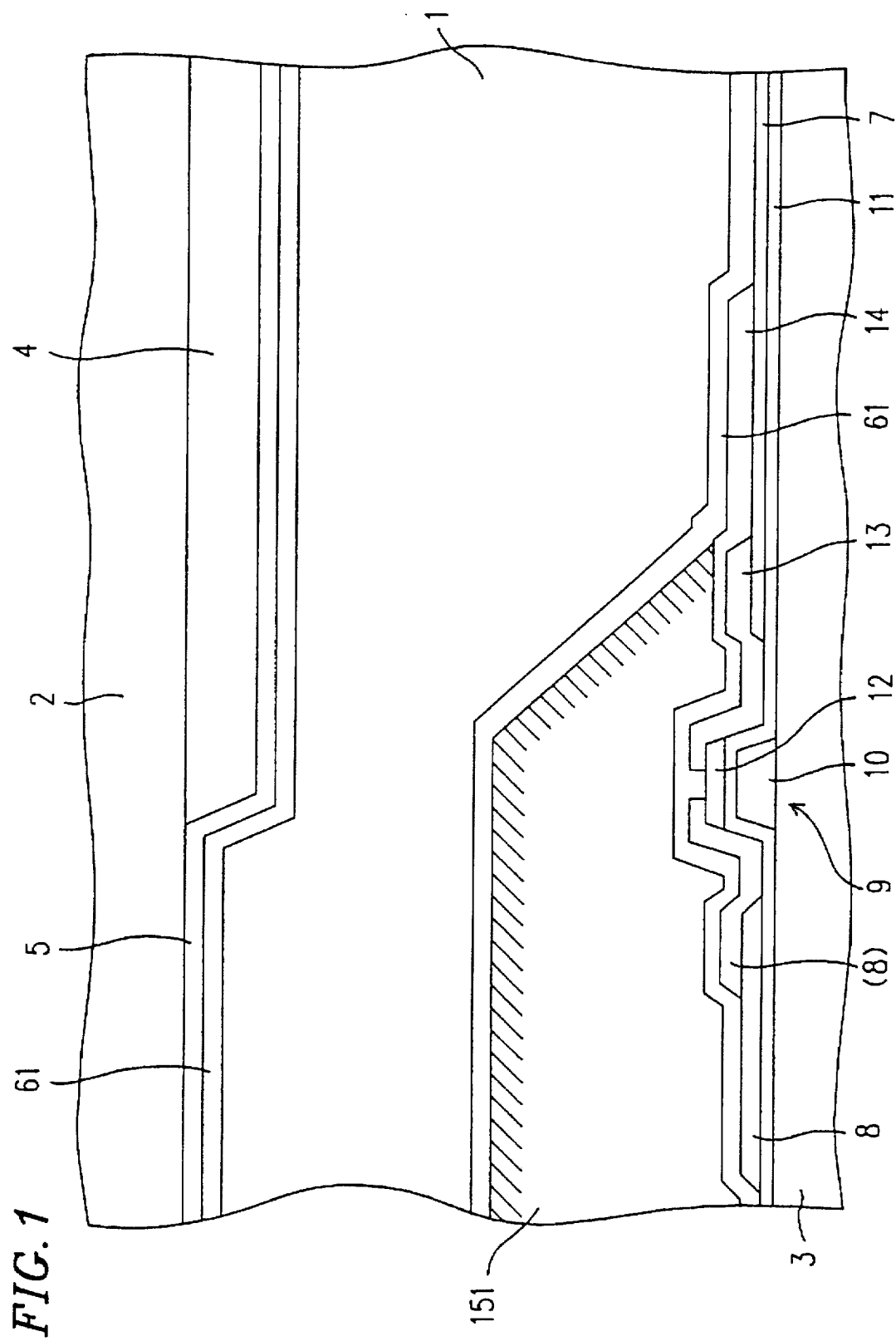
FIG. 1 is a partial cross-sectional view of a liquid crystal display device in an example of the present invention.

FIG. 1 is a partial cross-sectional view of a liquid crystal display device in an example of the present invention.

This liquid crystal display device includes a pair of glass substrates 2 and 3 disposed to face each other via a liquid crystal layer 1. A color filter layer 4 is formed on the glass substrate 2 and a transparent counter electrode 5 is further formed thereon so as to cover the glass substrate 2. A liquid crystal alignment film 61 for controlling the orientation directions of the liquid crystal molecules is further formed thereon.

This liquid crystal alignment film 61 is a polymer film having a large pretilt angle such as JALS827 (product number; manufactured by Japan Synthetic Rubber, Co., Ltd.) and has a pretilt angle α larger than one-half of the taper angle θ of the BM 151.

On the glass substrate 3, pixel electrodes 7; source lines 8 for supplying electric charges to the pixel electrodes 7; TFTs 9 functioning as switching elements; and gate lines 10 for supplying a control signal to the TFTs 9 are formed.

A TFT 9 includes: a gate electrode 10 or a part of the gate line 10 formed on the glass substrate 3; a gate insulating film 11 formed so as to cover the gate electrode 10; a semiconductor layer 12 formed on the gate insulating film 11 so as to overlap the gate line 10; and a source electrode 8 (or a part of the source line 8) and a drain electrode 13 which are formed on the semiconductor layer 12 so as to be separated from each other.

In order to suppress the variation in the device characteristics by preventing the light from being incident onto the TFT 9 and to prevent uncontrollable light leaking through this portion from affecting the display contrast ratio, a BM 151 is formed so as to cover the TFT 9, the source line 8 and the gate line 10 via an insulating film 14.

This BM 151 is formed of an insulating black resin film and has a profile in a taper shape having an angle θ (where θ<90°).

Figure 3:
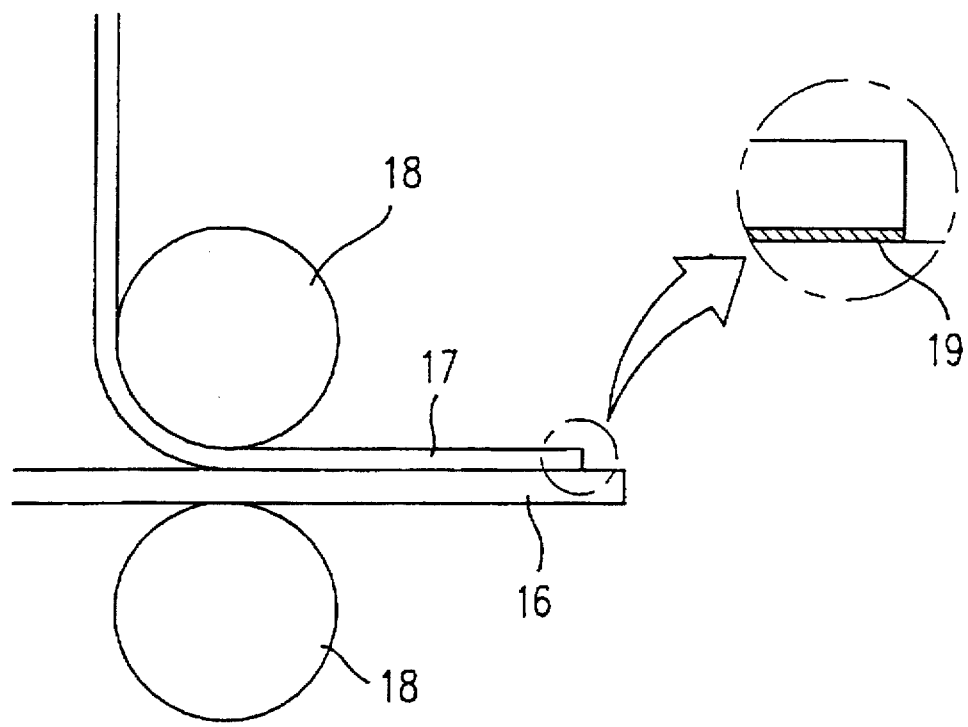
FIG. 3 is a schematic view illustrating the process steps for forming the BM according to the present invention.
Figure 4:
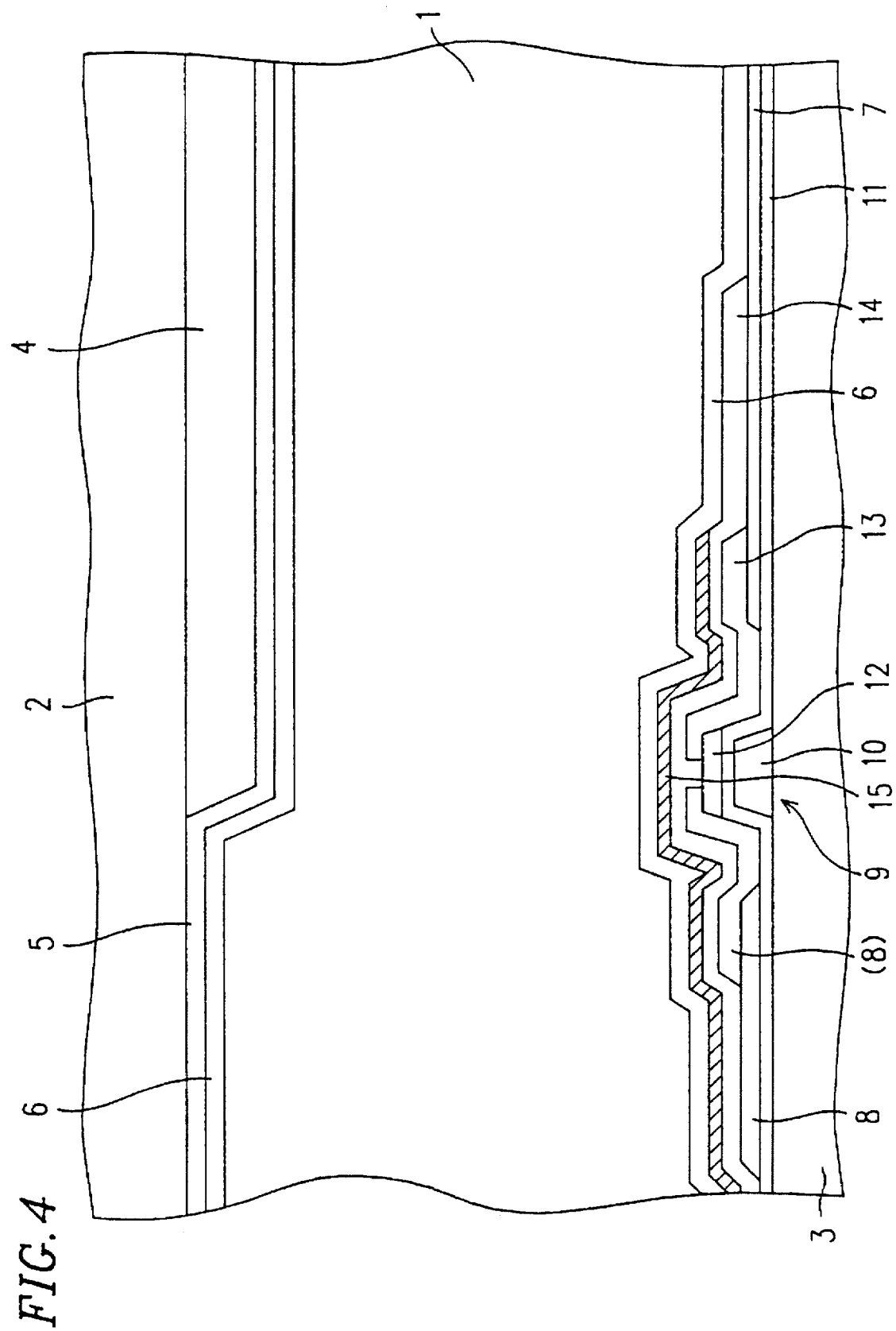
FIG. 4 is a cross-sectional view illustrating an exemplary conventional liquid crystal display device.
Figure 5:
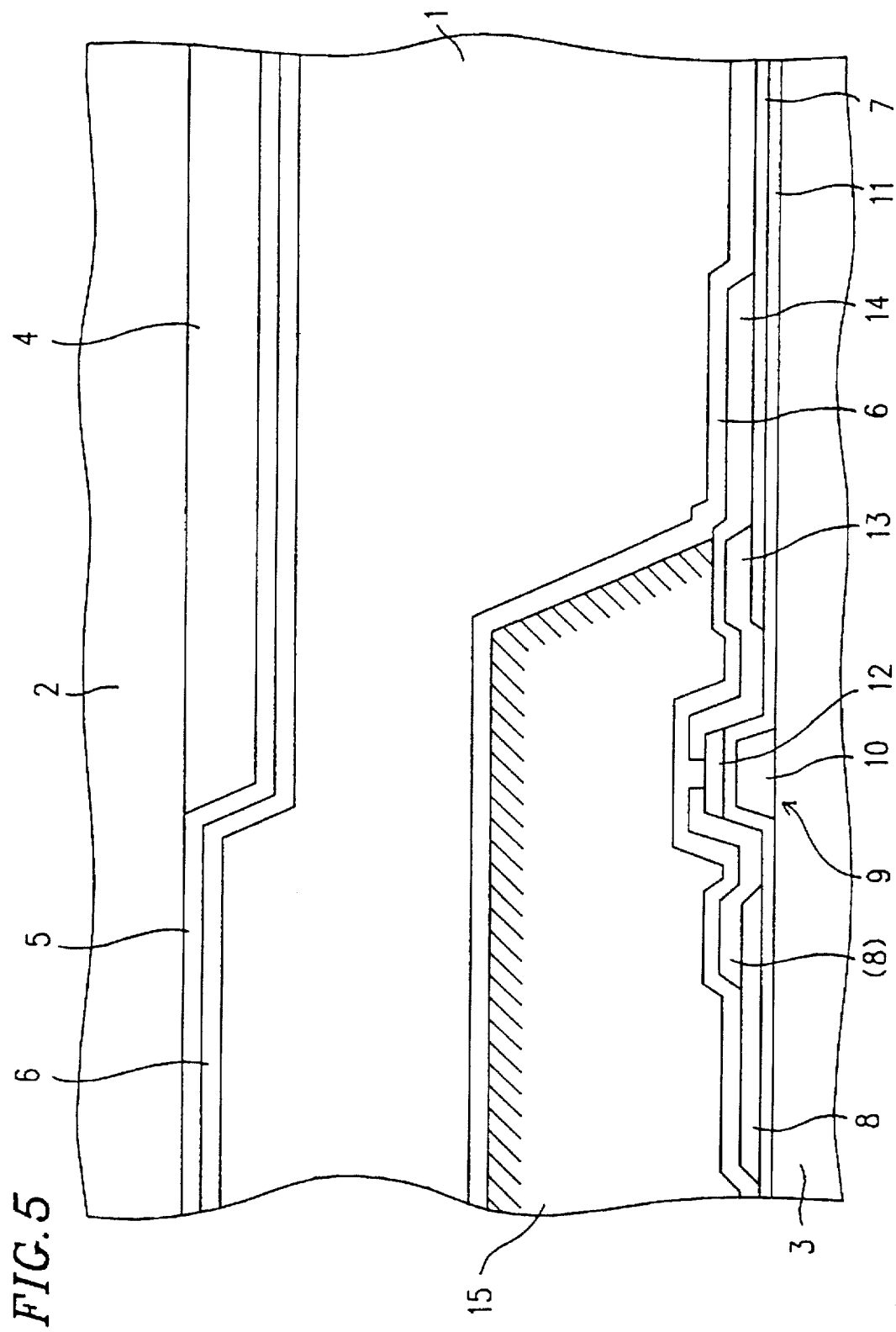
FIG. 5 is a cross-sectional view illustrating another exemplary conventional liquid crystal display device.
Figure 6A:
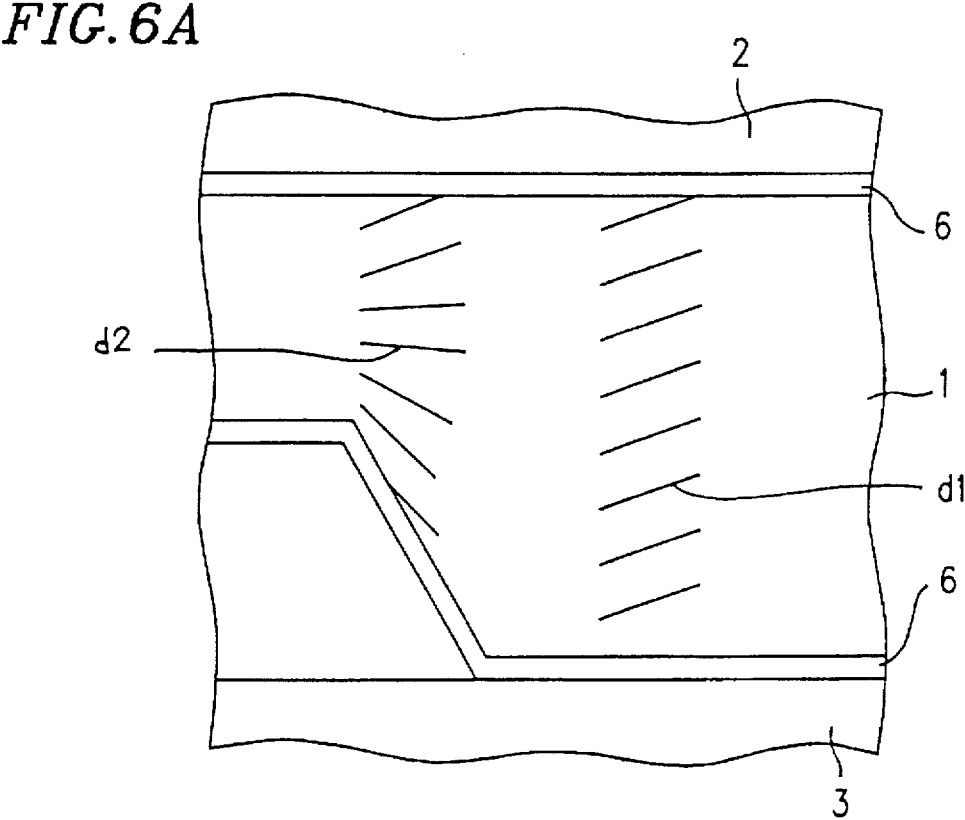
FIGS. 6A and 6B are cross-sectional views taken along the plane parallel to the orientation directions of the liquid crystal molecules for schematically illustrating the orientation states of the liquid crystal molecules in the conventional liquid crystal display device.
Figure 6B:
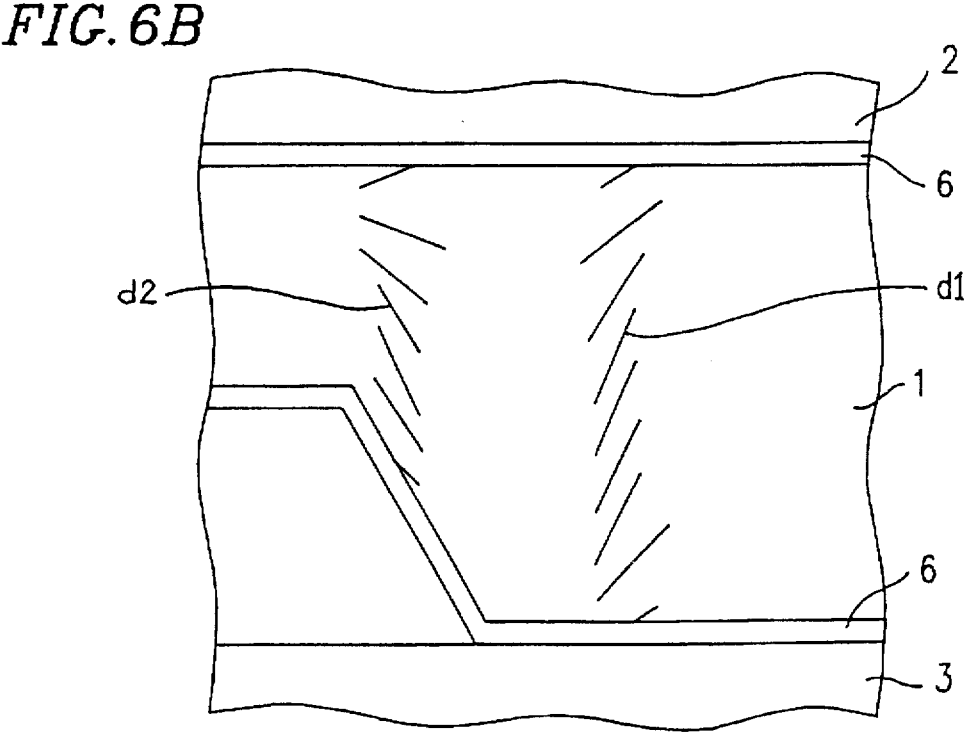

Next, the process steps for fabricating the BM 151 will be described with reference to FIG. 3.

First, a film 17 having a photosensitive colored layer 19 on the surface thereof is clad onto a substrate 16 having a TFT array thereon by using a roller 18 such that the photosensitive colored layer 19 comes into close contact with the surface of the substrate 16 on which the TFT array is formed. A film described in Japanese Laid-Open Patent Publication No. 4-212161 can be used as the film 17. The film may be clad onto the surface while applying heat thereto, depending upon the kind of the film to be used.

Next, all the portions of the film 17 other than the photosensitive colored layer 19 are removed by some chemical method such as wet etching or the like. Then the photosensitive colored layer 19 is patterned by a photolithography method. Since the photosensitive colored layer 19 has been formed so as to have a uniform thickness, a BM 151 having a uniform thickness can be formed.

Figure 2A:
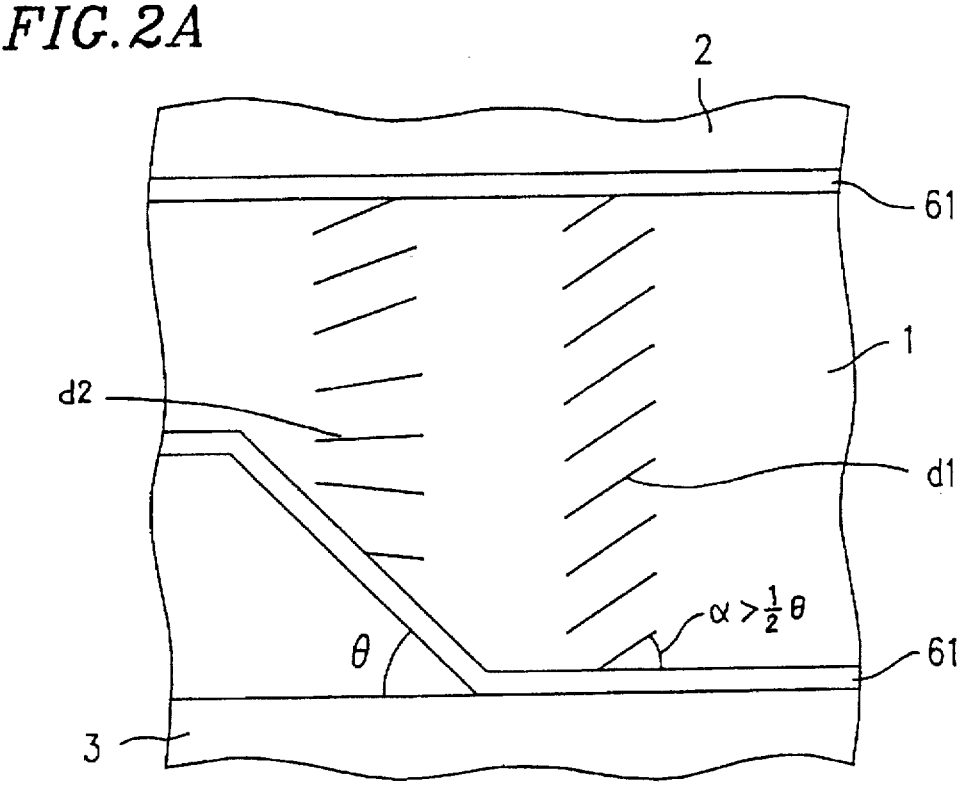
FIGS. 2A and 2B are cross-sectional views taken along the plane parallel to the orientation directions of the liquid crystal molecules for schematically illustrating the orientation states of the liquid crystal molecules in the liquid crystal display device illustrated in FIG. 1.
Figure 2B:
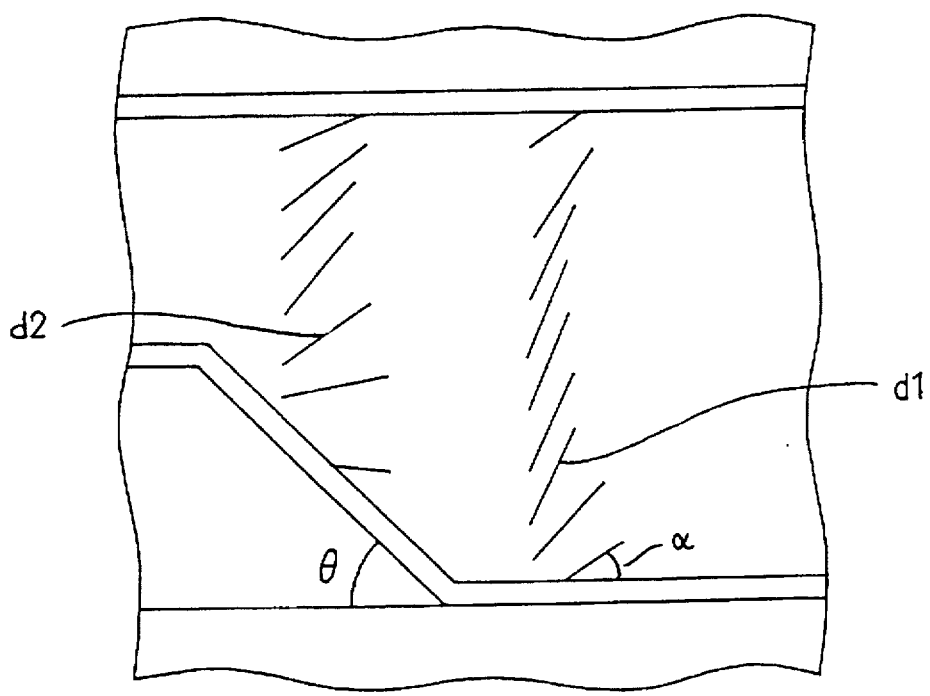

FIGS. 2A and 2B are cross-sectional views taken along the plane parallel to the orientation directions of the liquid crystal molecules for schematically illustrating the orientation states of the liquid crystal molecules in the liquid crystal display device in this example. In this liquid crystal display device, a pair of substrates 2 and 3 are disposed so as to face each other via a liquid crystal layer 1. A liquid crystal alignment film 61 for controlling the orientation directions of the liquid crystal molecules is formed on the surface of each of the substrates 2 and 3 which is in contact with the liquid crystal layer 1. Since the orientation directions of the liquid crystal molecules are generally twisted by 90°, the cross-sections of the substrates 2 and 3 in FIGS. 2A and 2B actually cross each other at a right angle. The liquid crystal alignment film 61 has a large pretilt angle α and aligns the orientation directions of the liquid crystal molecules such that the molecules are tilted by an angle α which is larger than one-half of the taper angle θ.

As illustrated in FIG. 2A, the liquid crystal molecules can be aligned so as to maintain a constant pretilt angle and a constant pretilt direction in a display region having no step-like portion, but the pretilt directions of some liquid crystal molecules are reversed with respect to the substrate 2 in a non-display region having a step-like portion. However, even if the pretilt directions of the liquid crystal molecules are reversed in the step-like portion, when a voltage is applied to the liquid crystal device, the average tilt direction of the liquid crystal molecules in the non-display region is the same as that in the display region having no step-like portion as illustrated in FIG. 2B. This is because the pretilt angle a is larger than one-half of the taper angle θ. Thus, since the liquid crystal molecules d2 in the non-display region rise to the same direction as the rising direction of the liquid crystal molecules d1 in the display region, a discontinuity is not generated in the orientation of the liquid crystal molecules. Consequently, an image can be displayed while reducing the amount of the leaking light and without leaving any residual image.

Table 1 shows in comparison the relationship between the taper angle θ and the pretilt angle α and the orientation state with respect to the liquid crystal display device according to the present invention and a conventional liquid crystal display device.

[TABLE 1]

|  | rising direction of liquid crystal molecules on taper | domain disclination | display definition |
|---|---|---|---|
| present invention $2\alpha > \theta$ | same direction as that of molecules on pixels | neither domain nor disclination is generated | O |
| conventional example $2\alpha \leq \theta$ | some molecules have rising direction opposite to | both domain & disclination are generated, residual image | X |

[TABLE 1]-continued

| that of molecules on pixels | & scattering light leakage are caused |
|---|---|

The actual values of the angles θ and α are determined based on the fabrication conditions and the optical characteristics of the liquid crystal display device. In the case where the pretilt angle α is small, the optical characteristics of the liquid crystal molecules are affected only slightly by the pretilt angle. However, when the pretilt angle α becomes too large, the apparent optical anisotropy is decreased and the optical characteristics are also affected by the angle. On the other hand, when the taper angle θ of the BM 151 is too small, the thickness of the BM 151 over the pixels and between the electrodes is reduced, so that the light may leak. For example, in the case of the liquid crystal display device illustrated in FIG. 1, a display can be performed satisfactorily when $\theta < 15°$ and $\alpha < 10°$.

As is apparent from the foregoing description, according to the present invention, since the sum of the pretilt angles of the liquid crystal alignment films provided for both of the substrates becomes larger than the taper angle of the BM, the reversal of the pretilt directions with respect to the substrate 2 is not caused by the step-like portion of the BM. Thus, it is possible to suppress an uneven display caused by the leakage of light and to display a satisfactory image without leaving any residual image.

In addition, a high-quality BM having a uniform film thickness can be formed of a film having a controlled thickness with lower costs.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:
    a liquid crystal layer;
    a liquid crystal alignment film in contact with the liquid crystal layer;
    a first substrate and a second substrate which are disposed so as to face each other with the liquid crystal layer sandwiched therebetween;
    a plurality of pixel electrodes arranged in a matrix on a surface, facing the liquid crystal layer, of the first substrate; and
    a counter electrode formed on a surface, facing the liquid crystal layer, of the second substrate,
    wherein a black matrix covering at least portions between the pixel electrodes is formed over the surface, facing the liquid crystal layer, of the first substrate; the black matrix is formed in a taper shape having a taper angle θ smaller than 90 degrees; and the liquid crystal alignment film provides a pretilt angle larger than one-half of the taper angle θ.

2. A liquid crystal display device according to claim 1, wherein the black matrix is formed of a film having a controlled thickness.

3. A liquid crystal display device according to claim 1, wherein the first substrate comprises a plurality of active elements, each of which is Connected to a corresponding one of the plurality of pixel electrodes.

4. A liquid crystal display device according to claim 1, wherein the black matrix is formed of an insulating resin.

\* \* \* \* \*